United States Patent Office 3,714,056
Patented Jan. 30, 1973

3,714,056
METHOD FOR PREPARING STABLE URANIA-PLUTONIA SOLS
Othar K. Tallent, Oak Ridge, Tenn., assignor to the United States of America as represented by the United States Atomic Energy Commission
No Drawing. Continuation-in-part of abandoned application Ser. No. 864,155, Oct. 6, 1969. This application June 10, 1971, Ser. No. 151,902
Int. Cl. C01g 43/02
U.S. Cl. 252—301.15
5 Claims

ABSTRACT OF THE DISCLOSURE

The present invention relates to a method for forming a static and dynamically stabilized mixed sol of plutonia and urania where the plutonium and uranium are primarily in the +4 oxidation state and where the sols are derived from solvent extraction of aqueous solutions of uranium nitrate and plutonium nitrate which comprises heating the urania sol component at a temperature and for a period of time sufficient to produce urania crystallities in the range 55–100 angstroms and then extracting nitrate ion from the mixed sol until a nitrate/uranium+plutonium mole ratio of 0.08 to 0.25 is obtained and to the resultant sol.

BACKGROUND OF THE INVENTION

The invention described herein was made in the course of, or under, a contract with the United States Atomic Energy Commission.

This application is a continuation-in-part of application Ser. No. 864,155, filed Oct. 6, 1969, now abandoned.

This invention relates generally to sol-gel processes for preparing nuclear fuels and more particularly to a method for preparing stable urania-plutonia sols wherein the oxidation-reduction between the tetravalent forms of the two species is substantially reduced. More particularly, it relates to a method for forming a stable mixed sol of plutonia and urania from sols prepared by solvent extraction processes.

By stable sol, I mean to refer to and distinguish between a static and dynamic condition. A sol stable in the static sense is one which remains a sol even after long periods of standing. A dynamically stable sol is one which can be processed successfully into dense, hard microspheres. In this sense, it is an object of this invention to provide a statically and dynamically stable mixed sol of urania and plutonia.

Dynamically stable mixed sols of $PuO_2$ and $UO_2$ are extremely difficult to prepare, especially from sols derived from solvent extraction processes. The principal difficulty apparently stems from the fact that statically stable sols of $PuO_2$ produced by solvent extraction procedures contain so much nitrate ion as to cause adverse chemical and physical interreaction in a mixed sol preparation as manifested by sol phase separation, thixotropy, and precipitation and results in cracked microspheres formed from the mixed sol. More specifically, lack of dynamic stability in mixed sols is limited by the difficulty in obtaining low-nitrate plutonia sols, i.e., those having a nitrate/plutonium mole ratio in the range 0.1–0.4. Plutonia sols produced by solvent extraction alone result in "high"-nitrate sols which are not sufficiently dynamically stable to produce sound plutonia-urania microspheres.

SUMMARY OF THE INVENTION

The present invention is predicated on the discovery that the crystallite size of the urania in the solid phase can be made to increase and the surface area of the solid phase to decrease by digesting a urania sol at a temperature in the range 80–100° C. Crystallite growth is accompanied by a release of nitrate ion from the solid to the liquid phase of the sol, which must be extracted or otherwise removed to maintain colloidal stability. When the digested urania sol is mixed with a plutonia sol, a dynamically stable mixed-sol system is obtained provided that the final nitrate/uranium+plutonium mole ratio falls within the range 0.08–0.25.

In a functionally equivalent manner of achieving a dynamically stable mixed sol, the urania sol can be codigested with a high-nitrate plutonia sol to achieve the desirable urania crystallite growth. It should, however, be recognized that, when codigestion of the mixed sol is the method of choice, it should be done quite soon after mixing. This will depend on total metal concentration. A time lapse of no more than about 1 hour after mixing a 1 M sol or about 24 hours for a 0.2 M sol will avoid the aforesaid chemical and physical interreactions between the plutonia and urania.

Digestion of urania sols or mixed sols of urania and plutonia to achieve significant crystallite growth from a small size to a crystallite size in the range 55–100 A. is a first prerequisite to forming a dynamically stable mixed sol. Crystallite growth of urania sols is promoted by digestion at a minimum temperature of 80° C. and a maximum practical temperature of 100° C., which is the approximate boiling point of the sol. At digestion temperatures lower than 80° C., crystallite growth does not occur to a practical degree. Higher temperatures may be used if the sol is pressurized such as in an autoclave. A second prerequisite for obtaining the desired dynamic stability involves controlling the free nitrate ion concentration (i.e., that nitrate affecting the conductivity of the sol) to a final nitrate/uranium+plutonium mole ratio in the range 0.08–0.25.

Mixed stable urania-plutonia sols which were 0.8 M $UO_2$, 0.2 M $PuO_2$, 0.1 M $NO_3^-$, 0.2 M $HCOO^-$ and which had average crystallite sizes of between 55 and 100 A. have typically been prepared by this method and were readily prepared into dense urania-plutonia microspheres 100–600 microns in size by forming into congealed droplets and calcining at 1150° C. in argon-4% hydrogen for 8 hours. The product urania-plutonia microspheres were crack-free, having smooth surfaces, and had an average crush strength of about 550 grams per 250-micron microspheres.

As a preliminary step of the present invention, the nitrate-stabilized uranium(IV) and plutonium(IV) sols are prepared. The uranium(IV) sol may be prepared by solvent extraction techniques, such as by the method disclosed in U.S. Pat. No. 3,367,881, issued Feb. 6, 1968, in the name of Leon E. Morse, for "Extraction Method for Preparing $UO_2$ Microspheres." In the Morse method, nitrate ion is extracted from an aqueous uranous nitrate solution with an organic solution of an amine. The aqueous phase containing a portion of the nitrate is permitted to adjust to the lower nitrate conditions and additional nitrate is then extracted from the resulting solution to produce a urania sol. Another method for preparing urania sols is disclosed in application Ser. No. 814,311, filed Apr. 8, 1969, in the name of John P. McBride et al., for "Production of Predominantly Crystalline Sols." The predominantly crystalline urania sol is prepared from an acid-deficient solution of uranous nitrate by heating the solution to a crystallizing temperature of between 58° and 65° C., and removing nitrate ions at that point at a rate which approximates the rate of release of free acid to the aqueous phase of the resultant sol.

The nitrate-stabilized plutonium(IV) sol is also prepared by solvent extraction techniques. In one method, a tetravalent plutonium nitrate solution is contacted with an immiscible amine to yield a high-nitrate plutonium sol. With this method it is critical in this phase of the process that the resulting tetravalent plutonium be in a polymer form. Plutonium polymer formation is facilitated by a low acid concentration and elevated temperatures, and, in a nitrate-stabilized system, nitrate-to-plutonium ratios of 2.0 to 1.0 insure this condition.

It is preferred that the extraction be carried out using an amine selected from primary, secondary, or tertiary amines having at least 10 carbon atoms in the molecule. A suitable amine is Amberlite LA–2 [n-lauryltrialkylmethylamine (M.W. 365)]. Where a 0.1 M plutonium nitrate-1.0 N nitric acid solution is employed, suitable tetravalent polymeric plutonium sol is prepared by extraction with 0.2 M n-lauryltrialkylmethylamine, yielding a sol which has a nitrate-to-plutonium mole ratio of 1 to 1.5. With an amine, the limit of extraction is a nitrate-to-plutonium mole ratio of about 1.0.

The time of digestion or codigestion requires at least one hour to achieve the desired growth of $UO_2$ crystallite size to 55–100 A. from an original size of 30–40 A. Longer digestion times may be employed without any serious effects and digestion times of up to three hours have resulted in stable, compatible urania-plutonia sols.

Upon completion of the digestion step, excess nitrate must be removed for successful microsphere preparation. The nitrate can be removed quite satisfactorily by amine or alcohol extraction of the digested urania-plutonia sol. While other anions are not necessary to the successful formation of a urania sol, formate has been found to be useful as a stabilizing reagent. Where the starting uranium solution contains formate, i.e., mixed nitric acid-formic acid, I have found that after the digestion step the formate is released from the $UO_2$ phase due to crystallite growth and, if left in the mixed sol after formation and growth of crystallites by digestion, its presence promotes pseudoplasticity and thixotropy of the mixed urania-plutonia sol. It is therefore desirable to remove formic acid from the digested urania or urania-plutonia sol prior to nitrate extraction. Formic acid is readily extracted from these sols by an aliphatic alcohol such as 2-ethyl-1-hexanol. For dilute formic acid solutions, about 1 M equilibrated with 2-ethyl-1-hexanol, the formic acid (organic/aqueous) distribution coefficient is 0.06 and equilibrium is obtained in less than 5 minutes. The presence of nitric acid, nitrate salts, or formate salts in dilute formic acid solutions does not interfere with formic acid extraction. Formate is not appreciably extracted from dilute stoichiometric, formate, or mixed nitrate-formate salt solutions of uranium or plutonium. Addition of excess nitric acid to such salt solutions permits most of the formate to be extracted into 2-ethyl-1-hexanol. Both dilute nitric and dilute formic acid are extractable into either amines or alcohols, but in mixed nitric acid-formic acid systems the nitric acid extracts selectively into the amine and the formic acid extracts selectively into 2-ethyl-1-hexanol. Accordingly, the most effective procedure, and the method preferred, in mixed-acid systems is to extract the excess formic acid prior to extracting the nitrate. Extraction to nitrate/uranium+plutonium mole ratios of 0.08 to 0.25 is preferred in the preparation of stable urania-plutonia sols which are compatible. Where mixed sols are prepared from a formate-nitrate urania sol, formate should be reduced to a final formate/uranium mole ratio in the range 0.15–0.3.

The mixed urania-plutonia sol may be concentrated to remove water, such as by evaporation at 100° C. The digestion and concentration phases may be combined and the method carried out at 100° C. for about 2 hours. Concentrations of uranium-plutonium after evaporation of 1 M are readily attained.

The mixed urania-plutonia sols (0.2 M) prepared by the method of this invention are statically stable. Such mixed sols remain fluid for more than a week with essentially no solids settling out. The average crystallite size as determined by X-ray line broadening of these mixed urania-plutonia sols is within the range of 55–100 A. However, it is believed that the plutonia crystallites in the mixed sols remain in the 5–15 A. range. Where the urania sol component of the mixed sol has been digested at the indicated temperature range, total precipitation of colloidal solids or severe thixotropy in dilute sols (0.2 M) is not found, whereas extensive precipitation and thixotropic effects were nearly always encountered in urania-plutonia sols prepared by solvent extraction methods without the urania digestion and crystallite growth. The absence of these severe problems indicates the improved compatibility of these urania-plutonia sols. Of equal, if not greater, importance is the high degree of dynamic stability of these sols as established by the fact that, after concentration to 0.8 M or greater, they can be processed to substantially crack-free calcined microspheres of high density and good crushing strength.

The product urania-plutonia sols are readily formed into dense calcined microspheres by well known methods, such as that disclosed in U.S. Pat. No. 3,290,122, issued Dec. 6, 1966, to S. D. Clinton et al., for "Process for Preparing Oxide Gel Microspheres From Sols." In such a method, the stable sol, in this case a mixed urania-plutonia sol of suitable concentration, is passed through a two-fluid nozzle downwardly into a tapered column which contains countercurrently flowing organic liquid, such as 2-ethyl-1-hexanol, and dispersed into droplets which then congeal into gel microspheres and settle to the bottom of the column. The gel microspheres are then air-dried at a temperature of about 120° C. and the dried green microspheres calcined at about 1200° C. for 4–8 hours under a suitable atmosphere such as argon-4% hydrogen.

Having described the invention in a general fashion, the following examples are given by way of illustration to show the particular process parameters and techniques in preparing dynamically stable urania-plutonia sols. Example I illustrates a technique where a urania sol is digested separately and prior to forming a mixed sol. Examples II and III show how codigestion can be used to advantage.

Example I

A urania sol was prepared by contacting an aqueous solution (1.3 M uranium(IV), 2.6 M nitrate, 0.6 M formate) with 0.25 M Amberlite LA–2 in n-paraffin to extract nitrate beginning at 25° C. and gradually increasing the temperature to about 60° C. The resulting nitrate-stabilized uranium(IV) sol, which had a nitrate/uranium mole ratio of about 0.15, was cooled to room temperature. One hundred ml. of this sol, 1.375 M uranium, 0.139 M nitrate, and 0.66 M formate, was diluted to 150 ml. with water and digested under argon at 100° C. for 3 hours. The cooled sol, having a crystallite diameter of 80° A., as measured by X-ray line broadening, was diluted to 250 ml. with water and mixed. Upon standing for 24 hours the solid phase settled to 68.5 ml., leaving a slightly yellow supernate (2 mg. uranium/ml.). The supernate was decanted and the solids were diluted with water to 100 ml. This sol settled slightly in 24 hours.

Twenty-five ml. of the digested urania sol was mixed with 5 ml. of a nitrate-stabilized low-crystallite-size plutonium(IV) sol (1.2 M plutonium, 0.95 M nitrate) of the type prepared by concentrating by evaporation. The mixed sol was extracted with 100 ml. of 0.05 M Amberlite LA–2 in n-paraffin. The mixed sol remained fluid for at least 24 hours and did not settle.

The fluid urania-plutonia sol was prepared into calcined microspheres (420-micron) by firing the gel microspheres at 1150° C. for 8 hours in an argon-4% hydrogen atmosphere. The product microspheres were black, shiny, and crack-free, having an average crushing strength of 584 grams per 420-micron microspheres.

Example II

A 0.2 M nitrate-stabilized uranium(IV) sol was prepared by extracting a 0.2 M uranium(IV) solution (nitrate/uranium ratio=2.6, formate/uranium ratio=0.5) with a 50 percent excess of 0.11 M Amberlite LA-2 in n-paraffin and digesting at 55° C., followed by a second amine extraction to form the sol.

A nitrate-stabilized plutonium(IV) sol was prepared by extracting 10 ml. of a 0.1 M plutonium nitrate-1.0 M nitric acid solution with 700 ml. of 0.2 M Amberlite LA-2 in n-paraffin and concentrating by evaporation at 100° C. to obtain a 0.20 M plutonia sol having a nitrate/plutonium mole ratio of 1.3.

Forty ml. of the 0.2 M urania sol was mixed with 10 ml. of the 0.2 M plutonia sol and the resultant mixture codigested at 100° C. for 3 hours. The resulting mixed sol was contacted with 10 ml. of 0.3 M Amberlite LA-2 in n-paraffin to remove excess nitrate, the final nitrate/uranium+plutonium mole ratio being 0.23. The mixed sol was then concentrated by evaporation at 100° C. for 3 hours to 0.99 M (plutonium and uranium) concentration and extracted with 70 ml. 2-ethyl-1-hexanol to remove excess formate, the formate/uranium+plutonium mole ratio being 0.29. The average crystallite size, as determined by X-ray line broadening, of the mixed urania-plutonia sol was 73 A.

The urania-plutonia sol, which was stable for at least 24 hours, was then formed without difficulty into calcined crack-free microspheres, average diameter 250 microns, and visually examined and tested for crush strength. The crush strength was 560 grams.

Example III

A formate-free uranous nitrate solution (0.2 M tetravalent uranium, 0.7 M nitrate) was prepared by electrodialysis and converted into a urania sol by the method employed in Example II. The urania sol was concentrated and digested at 90° C. under a stream of argon to 1.2 M. The urania sol was then mixed with a plutonium nitrate solution (0.12 M tetravalent plutonium, 1.4 M nitrate). The mixed sol-solution was extracted immediately with 10 ml. of 0.26 M Amberlite LA-2 in n-paraffin to a nitrate/uranium+plutonium mole ratio of 0.2.

Digestion of this sol was accomplished by heating the sol at 80° C. for one-half hour. The resulting mixed urania-plutonia sol had a crystallite size of 60 A., as measured by X-ray line broadening, and was quite stable. Microspheres were prepared and calcined at 1150° C. for 8 hours under argon-4% hydrogen. The microspheres were black, reflective, and crack-free, with a 383-gram crushing strength per 200-micron microsphere.

In the preceding description, we refer to urania and plutonia as being primarily in the +4 oxidation state. This should not, however, be taken to mean that minor amounts of other oxidation states may not also exist in the sols, since complex chemical interreactions between the uranium and plutonium are believed to occur in the colloidal (sol) mixtures dealt with in this invention.

What is claimed is:

1. A static and dynamic nitrate-stabilized mixed sol of urania and plutonia where the uranium and plutonium are primarily in the +4 oxidation state and where the nitrate/plutonium+uranium mole ratio is in the range 0.08–0.25 and the urania component in said sol consists of particles in the range 55–100 A.

2. The sol of claim 1 which contains, in addition, formate ion at a formate/uranium+plutonium mole ratio of no more than about 0.3.

3. The sol of claim 1 in which the total concentration of uranium and plutonium is 0.8 M to 1 M.

4. A method for forming a static and dynamically stabilized mixed sol of plutonia and urania where the plutonium and uranium are primarily in the +4 oxidation state and where the sols are derived from solvent extraction of aqueous solutions of uranium nitrate and plutonium nitrate which comprises heating the urania sol component at a temperature in the range 80°–100° C. for a period of time sufficient to produce urania crystallites in the range 55–100 A. and then extracting nitrate ion from the mixed sol until a nitrate/uranium+plutonium mole ratio of 0.08 to 0.25 is obtained.

5. The method according to claim 4 wherein a mixed urania-plutonia sol is heated to obtain the desired urania crystallite size.

References Cited
UNITED STATES PATENTS

| | | | |
|---|---|---|---|
| 3,335,095 | 8/1967 | Moore | 252—301.1 |
| 3,171,715 | 3/1965 | Kleinsteuber | 252—301.1 |
| 3,367,881 | 2/1968 | Morse | 252—301.1 |
| 3,310,386 | 3/1967 | Lloyd | 23—344 |
| 3,600,323 | 8/1971 | Tallent | 252—301.1 |

CARL D. QUARFORTH, Primary Examiner

R. L. TATE, Assistant Examiner

U.S. Cl. X.R.

423—251, 261